(12) United States Patent
Lim et al.

(10) Patent No.: US 9,359,944 B2
(45) Date of Patent: Jun. 7, 2016

(54) METHOD FOR CONTROLLING AN EXHAUST GAS RECIRCULATION APPARATUS FOR HEAVY CONSTRUCTION EQUIPMENT

(75) Inventors: Ji Hoon Lim, Seoul (KR); Min Seok Ko, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 355 days.

(21) Appl. No.: 13/981,184

(22) PCT Filed: Nov. 10, 2011

(86) PCT No.: PCT/KR2011/008559
§ 371 (c)(1),
(2), (4) Date: Jul. 23, 2013

(87) PCT Pub. No.: WO2012/102467
PCT Pub. Date: Aug. 2, 2012

(65) Prior Publication Data
US 2013/0298525 A1 Nov. 14, 2013

(30) Foreign Application Priority Data
Jan. 24, 2011 (KR) .................. 10-2011-0006702

(51) Int. Cl.
*F02B 33/44* (2006.01)
*F02M 25/07* (2006.01)
(Continued)

(52) U.S. Cl.
CPC .............. *F02B 47/08* (2013.01); *F02D 41/005* (2013.01); *F02M 26/07* (2016.02); *F02D 2200/101* (2013.01); *F02D 2200/501* (2013.01); *Y02T 10/47* (2013.01)

(58) Field of Classification Search
CPC . F02B 47/08; F02D 41/005; F02D 2200/101; F02M 25/0707; F02M 25/0709; F02M 25/071; Y02T 10/47
USPC .............. 60/605.2; 701/108; 123/568.21, 672
IPC ........................ F02B 47/08, 33/44; F02M 25/07
See application file for complete search history.

(56) References Cited

U.S. PATENT DOCUMENTS 6,820,599 B2 * 11/2004 Kurtz et al. .............. 123/568.21
6,863,058 B2 * 3/2005 Kurtz et al. .................... 123/672
(Continued)

FOREIGN PATENT DOCUMENTS

DE 102007003116 A1 * 7/2008 ............. F02M 25/07
EP 1375893 A1 * 1/2004 ............. F02M 25/07
(Continued)

OTHER PUBLICATIONS

Search Report dated May 1, 2012 and written in Korean with English translation attached for International Patent Application No. PCT/KR2011/008559 filed Nov. 10, 2011, 5 pages.

*Primary Examiner* — Thai Ba Trieu
(74) *Attorney, Agent, or Firm* — John D. Veldhuis-Kroeze; Westman, Champlin & Koehler, P.A.

(57) ABSTRACT

The present disclosure relates to a method for controlling an exhaust gas recirculation apparatus for heavy construction equipment, and more particularly, to a method for controlling an exhaust gas recirculation apparatus for heavy construction equipment, capable of controlling exhaust gas at an appropriate pressure at an appropriate step when making exhaust gas discharged from an engine flow into the engine together with fresh gas.

16 Claims, 3 Drawing Sheets

(51) Int. Cl.
*F02B 47/08* (2006.01)
*F02D 41/00* (2006.01)

(56) References Cited

U.S. PATENT DOCUMENTS

| | | | |
|---|---|---|---|
| 6,945,236 B2 * | 9/2005 | Nakai et al. | 60/605.2 |
| 6,973,786 B1 * | 12/2005 | Liu et al. | 60/605.2 |
| 7,168,250 B2 * | 1/2007 | Wei et al. | 60/605.2 |
| 7,302,939 B2 * | 12/2007 | Hill et al. | 123/568.21 |
| 8,495,992 B2 * | 7/2013 | Roth | F02M 25/071 60/605.2 |
| 2004/0084031 A1 | 5/2004 | Ito et al. | |
| 2006/0048760 A1 | 3/2006 | Matsunaga et al. | |
| 2006/0123773 A1 | 6/2006 | Zhang | |
| 2009/0249783 A1 * | 10/2009 | Gokhale et al. | 60/605.2 |
| 2012/0279215 A1 * | 11/2012 | Roth et al. | 60/605.2 |
| 2013/0298553 A1 * | 11/2013 | Lim | F02M 25/07 60/605.2 |

FOREIGN PATENT DOCUMENTS

| | | | | |
|---|---|---|---|---|
| FR | 2933740 A1 * | 1/2010 | | G02D 21/08 |
| FR | 2983252 A1 * | 5/2013 | | F02M 25/07 |
| JP | 11210449 A * | 3/1999 | | F02B 37/00 |
| WO | WO 2007040071 A1 * | 4/2007 | | F02M 25/0711 |
| WO | 2009148917 | 12/2009 | | |

* cited by examiner

PRIOR ART

METHOD FOR CONTROLLING AN EXHAUST GAS RECIRCULATION APPARATUS FOR HEAVY CONSTRUCTION EQUIPMENT

CROSS-REFERENCE TO RELATED APPLICATION

This Application is a Section 371 National Stage Application of International Application No. PCT/KR2011/008559, filed Nov. 10, 2011 and published, not in English, as WO2012/102467 on Aug. 2, 2012.

FIELD OF THE DISCLOSURE

The present disclosure relates to a method for controlling an exhaust gas recirculation apparatus for heavy construction equipment, and more particularly, to a method for controlling an exhaust gas recirculation apparatus for heavy construction equipment, capable of controlling exhaust gas at an appropriate pressure at an appropriate step when making exhaust gas discharged from an engine flow into the engine together with fresh gas.

BACKGROUND OF THE DISCLOSURE

In general, an ultimate objective of an exhaust gas recirculation (EGR) apparatus mounted on an engine for heavy construction equipment is to control discharge of nitrogen compounds (NOx) by inducing complete combustion inside the engine rather than to achieve high output by using a turbocharger or the like.

FIG. 1 illustrates a configuration view of an exhaust gas recirculation apparatus for heavy construction equipment related to the present disclosure.

As illustrated in FIG. 1, the present disclosure relates to an exhaust gas recirculation apparatus for heavy construction equipment, including: an engine 110; a turbocharger 120 which rotates a turbine 121 by using exhaust gas discharged from the engine 110, and compresses air, which is supplied to the engine 110, by a compressor 123 connected to the turbine 121 through a connecting shaft 122; an intercooler 130 which cools compressed air flowing into the engine 110; a high-pressure EGR line 140 which is provided with a high-pressure EGR cooler 142 and a high-pressure EGR valve 141, and does not pass through the turbocharger 120; a hybrid EGR line 150 which is provided with a hybrid EGR valve 151 and a hybrid EGR cooler 152, and does not pass through the turbine 121 of the turbocharger 120 but passes only through the compressor 123; and a low-pressure EGR line 160 which is provided with a low-pressure EGR valve 161 and a low-pressure EGR cooler 162, and passes through the turbocharger 120.

In the exhaust gas recirculation apparatus for heavy construction equipment, when the high-pressure EGR valve 141 is opened, a part of the exhaust gas discharged from an exhaust manifold 112 of the engine 110 is cooled in the high-pressure EGR cooler 142, and then supplied to an intake manifold 111 of the engine 110 together with fresh gas compressed by the compressor 123, while passing through the high-pressure EGR valve 141 and the intercooler 130, and when the low-pressure EGR valve 160 is opened, a part of the exhaust gas, which is discharged from the exhaust manifold 112 of the engine 110 and passes through the turbine 121 of the turbocharger 120, is induced into the compressor 123 of the turbocharger 120 while passing through the low-pressure EGR valve 141 and the low-pressure EGR cooler 142, compressed by the compressor 123 together with fresh gas flowing in through an air cleaner 170, and then supplied to the intake manifold 111 of the engine 110 while passing through the intercooler 130.

Further, when the hybrid EGR valve 151 is opened, a part of the exhaust gas discharged from the exhaust manifold 112 of the engine 110 is induced into the compressor 123 of the turbocharger 120 while passing through the hybrid EGR valve 151 and the hybrid EGR cooler 152, compressed by the compressor 123 together with fresh gas flowing in through the air cleaner 170, and then supplied to the intake manifold 111 of the engine 110 while passing through the intercooler 130.

Meanwhile, if the exhaust gas recirculation apparatus for heavy construction equipment is configured only with the high-pressure EGR line 140 which does not pass through the turbocharger 120, a process is necessary which allows a control balance between the exhaust gas recirculation apparatus and the turbocharger (T/C) to be maintained.

Further, as illustrated in FIG. 1, when the hybrid EGR line 150 and the low-pressure EGR line 160 are added in addition to the high-pressure EGR line 140, because even the exhaust gas, which is moved to the turbocharger (T/C) and the existing high-pressure EGR line 140, becomes an important factor that needs to be considered to be controlled, a control system is necessary which may maintain a balance between constituent components.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter.

The present disclosure has been made in consideration of the above problems in the related art, and an object of the present disclosure is to provide a method for controlling an exhaust gas recirculation apparatus for heavy construction equipment, capable of efficiently controlling the exhaust gas recirculation apparatus including a high-pressure EGR line which does not pass through a turbocharger, a low-pressure EGR line which passes through the turbocharger, and a hybrid EGR line which passes only through a compressor of the turbocharger.

To achieve the aforementioned object, a method for controlling an exhaust gas recirculation apparatus for heavy construction equipment of the present disclosure, which includes: an engine; a turbocharger which rotates a turbine by using exhaust gas discharged from the engine, and compresses air, which is supplied to the engine, by a compressor connected to the turbine through a connecting shaft; an intercooler which cools compressed air flowing into the engine; a high-pressure EGR line which is provided with a high-pressure EGR cooler and a high-pressure EGR valve, and does not pass through the turbocharger; a hybrid EGR line which is provided with a hybrid EGR valve and a hybrid EGR cooler, and does not pass through the turbine of the turbocharger but passes only through the compressor; and a low-pressure EGR line which is provided with a low-pressure EGR valve and a low-pressure EGR cooler, and passes through the turbocharger, includes a mechanical control step in which an engine control unit (ECU), which receives a low-load request signal from a driver, or driving and idle signals, opens the hybrid EGR valve 151 of the hybrid EGR line 150 such that mechanical control and electronic control are performed in harmony for optimized control.

The method for controlling the exhaust gas recirculation apparatus for heavy construction equipment of the present disclosure further includes opening the low-pressure EGR valve of the low-pressure EGR line when a driver request item input maintaining time is greater than a reference time.

Moreover, in the method for controlling the exhaust gas recirculation apparatus for heavy construction equipment of the present disclosure, the electronic control uses a manner in which the engine control unit, which receives a high-load request signal from a driver and a signal informing an entry into a work mode, opens and closes each of the EGR valves of each of the EGR lines, in accordance with the number of revolutions (rpm) of the engine, a vehicle velocity (Vehicle_v), and a torque variation amount.

In the electronic control, in a high-load work mode in which the number of revolutions (rpm) of the engine is a first reference value or more, the vehicle velocity (Vehicle_v) is zero, and the torque variation amount is a predetermined value A or more, closed loop high-pressure EGR valve control is performed which closes the hybrid EGR valve and the low-pressure EGR valve and controls only the high-pressure EGR valve.

In a high-load work stand-by mode in which the number of revolutions (rpm) of the engine is the first reference value or more, the vehicle velocity (Vehicle_v) is zero, and the torque variation amount is the predetermined value A or less, the closed loop high-pressure EGR valve control and an operation of opening the hybrid EGR valve are performed.

In a low-load work mode in which the number of revolutions (rpm) of the engine is the first reference value or less and a second reference value or more, the vehicle velocity (Vehicle_v) is zero, and the torque variation amount is the predetermined value A or more, the closed loop high-pressure EGR valve control and an operation of opening the hybrid EGR valve are performed.

In a low-load work stand-by mode in which the number of revolutions (rpm) of the engine is the first reference value or less and the second reference value or more, the vehicle velocity (Vehicle_v) is zero, and the torque variation amount is the predetermined value A or less, the closed loop high-pressure EGR valve control, an operation of closing the hybrid EGR valve, and an operation of opening the low-pressure EGR valve are performed.

In a driving mode or a non-work mode in which the number of revolutions of the engine is the second reference value or less and a third reference value or more, or the vehicle velocity (Vehicle_v) is not zero, the closed loop high-pressure EGR valve control, an operation of opening the hybrid EGR valve, and an operation of opening the low-pressure EGR valve are performed.

According to the method for controlling the exhaust gas recirculation apparatus for heavy construction equipment of the present disclosure, as the EGR is electronically and precisely controlled after the mechanical control is performed, it is possible to greatly improve an effect of reducing NOx, and supplement parts where an effect of reducing NOx is differently achieved in accordance with heavy construction equipment with precise control.

In addition, in a case of the mechanical control, high cost is caused in a process in which the controller is developed because relevant components needs to be manufactured one by one with respect to various test modes, but in a case of the electronic control, cost and time may be reduced because the process is possible by changing an interior program, and the mechanical control may be applied to only an engine that is subjected to specific heavy construction equipment, however, according to the method for controlling the exhaust gas recirculation apparatus for heavy construction equipment of the present disclosure, which harmoniously use the mechanical control and the electronic control, it is possible to obtain an effect in which the control may be easily applied by a simple change even in various types of engines for heavy construction equipment.

DESCRIPTION OF MAIN REFERENCE NUMERALS OF DRAWINGS

110: Engine
111: Intake manifold
112: Exhaust manifold
120: Turbocharger
121: Turbine
122: Connecting shaft
123: Compressor
130: Intercooler
140: High-pressure EGR line
150: Hybrid EGR line
160: Low-pressure EGR line

DETAILED DESCRIPTION

Hereinafter, specific technology contents of the present disclosure to achieve the aforementioned object will be described in detail with respect to the accompanying drawings.

Figure 1:
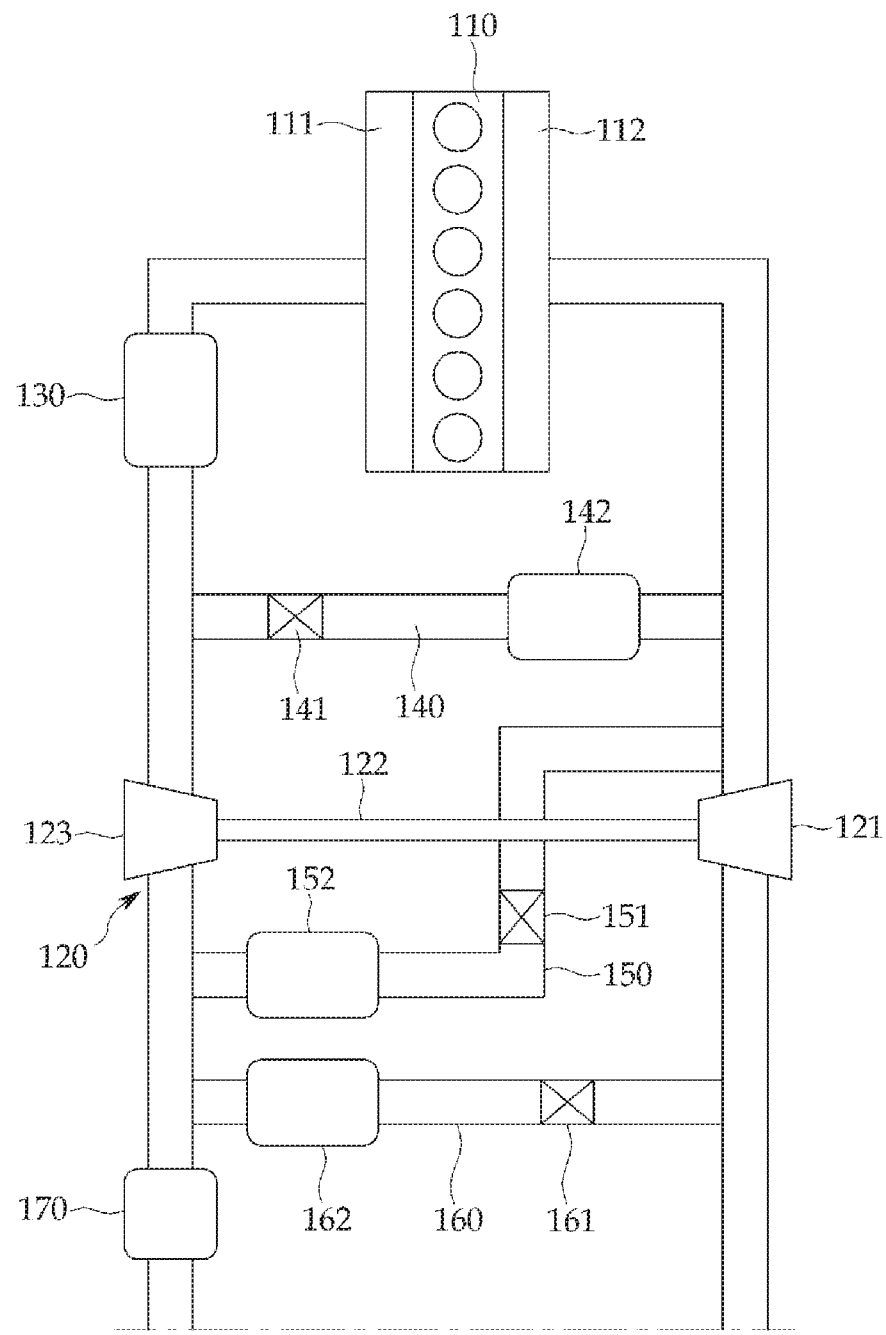
FIG. 1 is a configuration view of an exhaust gas recirculation apparatus for heavy construction equipment related to the present disclosure.
Figure 2:
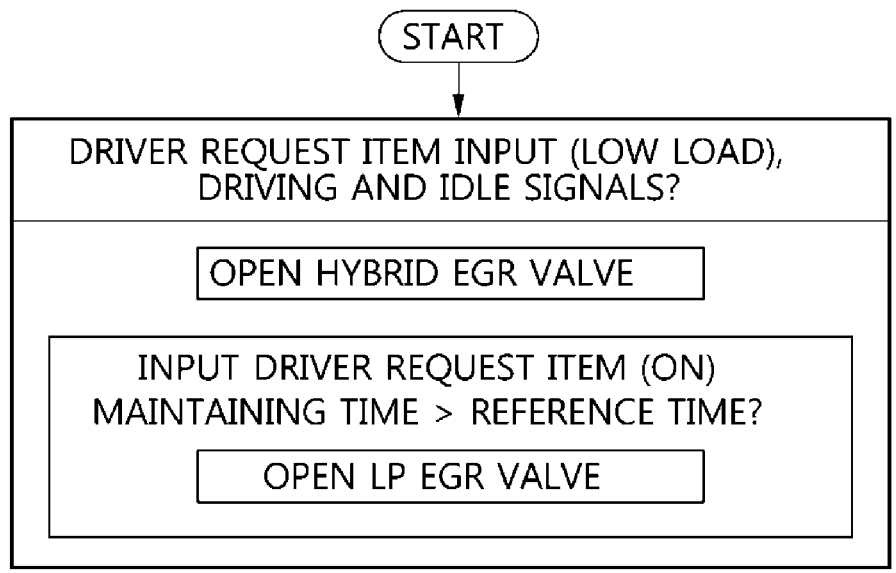
FIG. 2 is a flow chart of a mechanical control of the exhaust gas recirculation apparatus for heavy construction equipment according to the present disclosure.
Figure 3:
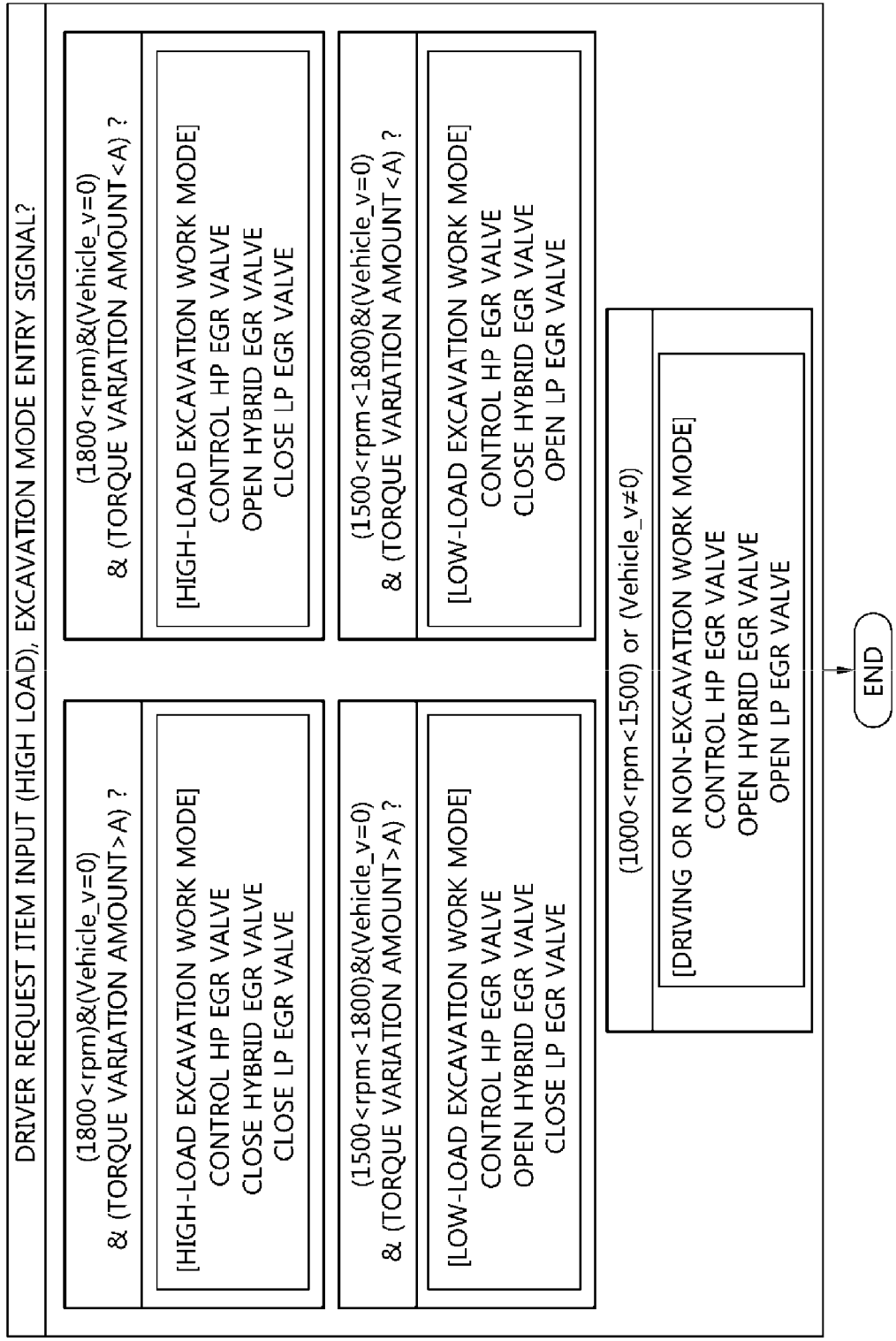
FIG. 3 is a flow chart of an electronic control of the exhaust gas recirculation apparatus for heavy construction equipment according to the present disclosure.

FIG. 2 illustrates a flow chart of a mechanical control of an exhaust gas recirculation apparatus for heavy construction equipment according to the present disclosure, and FIG. 3 illustrates a flow chart of an electronic control of the exhaust gas recirculation apparatus for heavy construction equipment according to the present disclosure.

A method for controlling an exhaust gas recirculation apparatus for heavy construction equipment of the present disclosure, which includes: an engine 110; a turbocharger 120 which rotates a turbine 121 by using exhaust gas discharged from the engine 110, and compresses air, which is supplied to the engine 110, by a compressor 123 connected to the turbine 121 through a connecting shaft 122; an intercooler 130 which cools compressed air flowing into the engine 110; a high-pressure EGR line 140 which is provided with a high-pressure EGR cooler 142 and a high-pressure EGR valve 141, and does not pass through the turbocharger 120; a hybrid EGR line 150 which is provided with a hybrid EGR valve 151 and a hybrid EGR cooler 152, and does not pass through the turbine 121 of the turbocharger 120 but passes only through the compressor 123; and a low-pressure EGR line 160 which is provided with a low-pressure EGR valve 161 and a low-pressure EGR cooler 162, and passes through the turbocharger 120, allows mechanical control and electronic control to be performed in harmony for optimized control.

In the method for controlling the exhaust gas recirculation apparatus for heavy construction equipment of the present disclosure, as illustrated in FIG. 2, the mechanical control includes: opening the hybrid EGR valve 151 of the hybrid EGR line 150 by an engine control unit (ECU) which receives a low-load request signal from a driver, or driving and idle signals; and opening the low-pressure EGR valve 161 of the low-pressure EGR line 160 when a driver request item input maintaining time is greater than a reference time.

Further, in the method for controlling the exhaust gas recirculation apparatus for heavy construction equipment of the present disclosure, the electronic control use a manner in which the engine control unit, which receives a high-load request signal from a driver and a signal informing an entry into a work mode, opens and closes each of the EGR valves 141, 151, and 161 of each of the EGR lines 140, 150, and 160, in accordance with the number of revolutions (rpm) of the engine, a vehicle velocity (Vehicle_v), and a torque variation amount.

That is, in a high-load work mode in which the number of revolutions (rpm) of the engine is a first reference value or more, the vehicle velocity (Vehicle_v) is zero, and the torque variation amount is a predetermined value A or more, closed loop high-pressure EGR valve control is performed which closes the hybrid EGR valve 151 and the low-pressure EGR valve 161 and controls only the high-pressure EGR valve 141.

Further, in a high-load work stand-by mode in which the number of revolutions (rpm) of the engine is the first reference value or more, the vehicle velocity (Vehicle_v) is zero, and the torque variation amount is the predetermined value A or less, the closed loop high-pressure EGR valve control and an operation of opening the hybrid EGR valve 151 are performed.

In a low-load work mode in which the number of revolutions (rpm) of the engine is the first reference value or less and a second reference value or more, the vehicle velocity (Vehicle_v) is zero, and the torque variation amount is the predetermined value A or more, the closed loop high-pressure EGR valve control and an operation of opening the hybrid EGR valve 151 are performed.

In a low-load work stand-by mode in which the number of revolutions (rpm) of the engine is the first reference value or less and the second reference value or more, the vehicle velocity (Vehicle_v) is zero, and the torque variation amount is the predetermined value A or less, the closed loop high-pressure EGR valve control, an operation of closing the hybrid EGR valve 151, and an operation of opening the low-pressure EGR valve 161 are performed.

Lastly, in a driving mode or a non-work mode in which the number of revolutions (rpm) of the engine is the second reference value or less and a third reference value or more, or the vehicle velocity (Vehicle_v) is not zero, the closed loop high-pressure EGR valve control, an operation of opening the hybrid EGR valve 151, and an operation of opening the low-pressure EGR valve 161 are performed.

The method for controlling the exhaust gas recirculation apparatus for heavy construction equipment of the present disclosure optimizes elements, which control the exhaust gas recirculation apparatus that may be complicated by being provided with the high-pressure EGR line 140, the hybrid EGR line 150, and the low-pressure EGR line 160, with the number of revolutions (rpm) of the engine, the torque variation amount, and the vehicle velocity (Vehicle_v), which are essential items in the heavy construction equipment, and performs convenient and optimized control by separating the mechanical control and the electronic control from each other on the basis of the driver request having a maximum priority and the signal informing an entry into a work mode.

That is, the method for controlling the exhaust gas recirculation apparatus for heavy construction equipment of the present disclosure performs the mechanical control when receiving a low-load request signal from a driver, or driving and idle signals, and performs the electronic control in consideration of the number of revolutions (rpm) of the engine, the vehicle velocity (Vehicle_v), and the torque variation amount A when receiving a high-load request signal from a driver and an electronic signal informing an entry into a work mode.

In the method for controlling the exhaust gas recirculation apparatus for heavy construction equipment of the present disclosure, the hybrid EGR valve 151 is first opened by the mechanical control when receiving a low-load request signal from a driver, or driving and idle signals, and the low-pressure EGR valve 162 is additionally opened when there is no input of an additional and exclusive signal while a predetermined time elapses.

In the method for controlling the exhaust gas recirculation apparatus for heavy construction equipment of the present disclosure, the high-pressure EGR valve 141 is used depending on various basic signals in general middle, low, and high-load modes.

The hybrid EGR valve 151 is used in a high-load work stand-by mode and a low-load work mode, and has a merit of supplying a large amount of EGR gas in a short period of time, but is relatively vulnerable in terms of stability compared to the low-pressure EGR valve 161.

The low-pressure EGR valve 161 is used in a low-load work stand-by mode and a mode below the low-load work stand-by mode, has high stability, and may supply a large amount of EGR gas, but has a drawback in that responsiveness is low.

In the method for controlling the exhaust gas recirculation apparatus for heavy construction equipment of the present disclosure, when there is an input of a high-load request signal from a driver or a signal informing an entry into a work mode, each of the EGR valves 141, 151, and 161 is controlled as follows.

For example, when the number of revolutions of the engine is 1,800 rpm or more, the vehicle velocity (Vehicle_v) is zero, and the torque variation amount is the predetermined value A or more, the mode is recognized as the high-load work mode, and only the closed loop high-pressure EGR valve control is performed.

When the number of revolutions of the engine is 1,800 rpm or more, the vehicle velocity (Vehicle_v) is zero, and the torque variation amount is the predetermined value A or less, the mode is recognized as the high-load work stand-by mode, and the closed loop high-pressure EGR valve control and the operation of opening the hybrid EGR valve are performed.

When the number of revolutions of the engine is 1,500 rpm or more and 1,800 rpm or less, the vehicle velocity (Vehicle_v) is zero, and the torque variation amount is the predetermined value A or more, the mode is recognized as the low-load work mode, and the closed loop high-pressure EGR valve control and the operation of opening the hybrid EGR valve are performed.

When the number of revolutions of the engine is 1,500 rpm or more and 1,800 rpm or less, the vehicle velocity (Vehicle_v) is zero, and the torque variation amount is the predetermined value A or less, the mode is recognized as the low-load work stand-by mode, and the closed loop high-pressure EGR valve control and the operation of opening the low-pressure EGR valve are performed.

When the number of revolutions of the engine is 1,000 rpm or more and 1,500 rpm or less, or when the vehicle velocity is not zero (Vehicle_v≠0), the mode is recognized as the driving mode or the non-work mode, and the high-pressure EGR valve control and the operation of opening the hybrid/low-pressure EGR valves are performed.

The present disclosure described above is not limited to the aforementioned description, and it is apparent to the person skilled in the art that various substitutions, modifications, and alterations may be possible without departing from the technical spirit of the present disclosure.

The method for controlling the exhaust gas recirculation apparatus for heavy construction equipment according to the present disclosure may be used to control exhaust gas at an appropriate pressure in an appropriate step when making exhaust gas flow into the engine together with fresh gas in the exhaust gas recirculation (EGR) apparatus which is mounted in the engine.

The invention claimed is:

1. A method of controlling an exhaust gas recirculation apparatus for heavy construction equipment comprising:
an engine;
a turbocharger, coupled to and configured to receive exhaust gas discharged from the engine, which rotates a turbine by using the exhaust gas discharged from the engine, and compresses air, which is supplied to the engine, by a compressor connected to the turbine through a connecting shaft;
an intercooler coupled to the compressor and the engine which cools compressed air flowing into the engine;
a high-pressure exhaust gas recirculation (EGR) line which is provided with a high-pressure EGR cooler and a high-pressure EGR valve, and does not pass through the turbocharger;
a hybrid EGR line which is provided with a hybrid EGR valve and a hybrid EGR cooler, and does not pass through the turbine of the turbocharger but passes only through the compressor;
a low-pressure EGR line which is provided with a low-pressure EGR valve and a low-pressure EGR cooler, and passes through the turbocharger; and
an engine control unit,
the method comprising:
detecting at least one of a high-load request signal from a driver and a signal informing an entry into a work mode,
opening the hybrid EGR valve of the hybrid EGR line when a number of revolutions per minute (rpm) of the engine is equal to or greater than a first reference value, a vehicle velocity (Vehicle_v) is zero, and a torque variation amount is greater than or equal to a predetermined value A, and
opening the low-pressure EGR valve of the low pressure EGR line when a driver request item input maintaining time of the request signal from the driver is greater than a reference time.

2. The method of claim 1, wherein the first reference value is 1,800 revolutions per minute (rpm).

3. The method of claim 1, wherein during the at least one of the high-load request signal from the driver and the signal informing entry into the work mode, opening and closing each of the high-pressure EGR valve, the hybrid EGR valve and the low-pressure EGR valve, in accordance with the number of revolutions per minute (rpm) of the engine, the vehicle velocity (Vehicle_v), and the torque variation amount.

4. The method of claim 3, wherein in a low-load work mode in which the number of revolutions per minute (rpm) of the engine is less than or equal to the first reference value and is greater than or equal to a second reference value, the vehicle velocity (Vehicle_v) is zero, and the torque variation amount is greater than or equal to the predetermined value A, adjusting the high-pressure EGR valve and opening the hybrid EGR valve.

5. The method of claim 3, wherein in a low-load work stand-by mode in which the number of revolutions per minute (rpm) of the engine is less than or equal to the first reference value and is greater than or equal to a second reference value, the vehicle velocity (Vehicle_v) is zero, and the torque variation amount is less than or equal to the predetermined value A, adjusting the high-pressure EGR valve, closing the hybrid EGR valve, and opening the low-pressure EGR valve.

6. The method of claim 3, wherein in a driving mode or a non-work mode in which the number of revolutions per minute (rpm) of the engine is less than or equal to a second reference value and is greater than or equal to a third reference value, or the vehicle velocity (Vehicle_v) is not zero, adjusting the high-pressure EGR valve, opening the hybrid EGR valve, and an operation of opening the low-pressure EGR valve.

7. The method of claim 1, wherein in the electronic control, in a high-load work mode in which the number of revolutions per minute (rpm) of the engine is greater than or equal to a first reference value, the vehicle velocity (Vehicle_v) is zero, and the torque variation amount is greater than or equal to a predetermined value A, adjusting only the high-pressure EGR valve while closing the hybrid EGR valve and the low-pressure EGR valve.

8. The method of claim 7, wherein in a high-load work stand-by mode in which the number of revolutions per minute (rpm) of the engine is greater than or equal to the first reference value, the vehicle velocity (Vehicle_v) is zero, and the torque variation amount is less than or equal to the predetermined value A, adjusting the high-pressure EGR valve and opening the hybrid EGR valve.

9. A method of controlling an exhaust gas recirculation apparatus for heavy construction equipment comprising:
an engine;
a turbocharger, coupled to and configured to receive exhaust gas discharged from the engine, which rotates a turbine by using the exhaust gas discharged from the engine, and compresses air, which is supplied to the engine, by a compressor connected to the turbine through a connecting shaft;
an intercooler coupled to the compressor and the engine which cools compressed air flowing into the engine;
a closed loop high-pressure exhaust gas recirculation (EGR) line which is provided with a closed loop high-pressure EGR cooler and a high-pressure EGR valve, and does not pass through the turbocharger;
a hybrid EGR line which is provided with a hybrid EGR valve and a hybrid EGR cooler, and does not pass through the turbine of the turbocharger but passes only through the compressor;
a low-pressure EGR line which is provided with a low-pressure EGR valve and a low-pressure EGR cooler, and passes through the turbocharger; and
an engine control unit,
the method comprising:
detecting at least one of a low-load request signal from a driver and a signal informing an entry into a work mode, opening the closed loop high-pressure EGR valve and the hybrid EGR valve of the hybrid EGR line when a number of revolutions per minute (rpm) of the engine is between a second reference value and a first reference value,
  wherein the second reference value is less than the first reference value, a vehicle velocity (Vehicle_v) is zero, and a torque variation amount is greater than or equal to a predetermined value A, and
  opening the low-pressure EGR valve of the low-pressure EGR line when a driver request item input maintaining time of the request signal from the driver is greater than a reference time.

10. The method of claim 9, wherein the first reference value is 1,800 rpm, and the second reference value is 1,500 rpm.

11. The method of claim 9, during the at least one of the high-load request signal from the driver and the signal informing entry into the work mode, opening and closing each of the high-pressure EGR valve, the hybrid EGR valve and the low-pressure EGR valve, in accordance with the number of revolutions per minute (rpm) of the engine, the vehicle velocity (Vehicle_v), and the torque variation amount.

12. The method of claim 11, wherein in a low-load work mode in which the number of revolutions per minute (rpm) of the engine is less than or equal to the first reference value and is greater than or equal to a second reference value, the vehicle velocity (Vehicle_v) is zero, and the torque variation amount is greater than or equal to the predetermined value A, adjusting the closed loop high-pressure EGR valve and opening the hybrid EGR valve.

13. The method of claim 11, wherein in a low-load work stand-by mode in which the number of revolutions per minute (rpm) of the engine is less than or equal to the first reference value and is greater than or equal to a second reference value, the vehicle velocity (Vehicle_v) is zero, and the torque variation amount is less than or equal to the predetermined value A, adjusting the closed loop high-pressure EGR valve, of closing the hybrid EGR valve, and opening the low-pressure EGR valve.

14. The method of claim 11, wherein in a driving mode or a non-work mode in which the number of revolutions per minute (rpm) of the engine is less than or equal to a second reference value and is greater than or equal to a third reference value, or the vehicle velocity (Vehicle_v) is not zero, adjusting the closed loop high-pressure EGR valve, opening the hybrid EGR valve, and of opening the low-pressure EGR valve.

15. The method of claim 9, wherein in the electronic control, in a high-load work mode in which the number of revolutions per minute (rpm) of the engine is greater than or equal to a first reference value, the vehicle velocity (Vehicle_v) is zero, and the torque variation amount is greater than or equal to a predetermined value A, adjusting only the closed loop high-pressure EGR valve while closing the hybrid EGR valve and the low-pressure EGR valve.

16. The method of claim 15, wherein in a high-load work stand-by mode in which the number of revolutions per minute (rpm) of the engine is greater than or equal to the first reference value, the vehicle velocity (Vehicle_v) is zero, and the torque variation amount is less than or equal to the predetermined value A, adjusting the closed loop high-pressure EGR valve and opening the hybrid EGR valve.

* * * * *